Feb. 2, 1971    J. C. BARBER ET AL    3,559,480
MULTIRANGE FLOWMETER WITH AUTOMATIC METER SEQUENCING
Filed Dec. 20, 1968    2 Sheets-Sheet 1

INVENTORS
JUSTUS C. BARBER
THERON W. JENKINS, JR.

BY *William H. Miller Jr.*

AGENT

_United States Patent Office_

3,559,480
Patented Feb. 2, 1971

3,559,480
MULTIRANGE FLOWMETER WITH AUTOMATIC METER SEQUENCING
Justus C. Barber, King of Prussia, and Theron W. Jenkins, Jr., Ambler, Pa., assignors to Leeds & Northrup Company, Philadelphia, Pa., a corporation of Pennsylvania
Filed Dec. 20, 1968, Ser. No. 785,553
Int. Cl. G01f 7/00
U.S. Cl. 73—197                    7 Claims

ABSTRACT OF THE DISCLOSURE

A measurement of fluid flow rate over a wide range is made by using a low range meter and a high range meter and obtaining the output from the low range meter below a transfer point and from the high range meter above the transfer point. The transfer is made in a bumpless manner by biasing the meter outputs in the overlapping portion of their ranges when the meters produce an output beyond a transfer point. The biasing is such that the characteristics of the two meters cross so that equal outputs appear at one point. By selecting the highest absolute outputs of the meters a transfer of the output from one meter to the other occurs in order to utilize the range most accurate for each of the meters.

BACKGROUND OF THE INVENTION

This invention relates to apparatus for making accurate wide range measurements of fluid flow rate and more particularly to apparatus utilizing a plurality of flowmeters whose outputs are sequentially used to provide an output indicative of the flow so that a high degree of accuracy of the flow rate measurement may be made over a wide range. The sequencing is accomplished by automatic means.

In the past the bumpless sequencing of flowmeters measuring in different ranges has been accomplished by adding a signal such as a voltage to the output of the meter to which the transfer is to be made to make its output equal to the output of the meter in use when the flow rate is at the desired transfer point. When such an equality is attained, the transfer of the output is made between the meters and the added signal is gradually removed. By that means it was possible to obtain the transfer of the output from one meter to the other in a bumpless manner; that is, without any discontinuity in the output. Such an arrangement, however, has many disadvantages. Among these is the change in the output signal or, in other words, the flow rate measurement after the transfer. This is due to the removal of the added signal and this change would occur even though no actual change was occurring in the flow rate itself. This characteristic of the prior art has led to problems when the output is used for the control of a process, such as in control systems for steam boilers, in that a false control results from that change.

SUMMARY OF THE INVENTION

In accordance with this invention there is provided apparatus for measuring the fluid flow rate over a wide range by utilizing a first flowmeter to produce a first signal as a function of the fluid flow rate over a first range and a second flowmeter operable to produce a second signal as a function of the fluid flow rate over a second range which overlaps the first range but extends beyond the first range to higher flow rates. To accomplish a transfer between the two flowmeters without a bump there is provided a transfer circuit which is operable to produce an output signal in response to the first signal over a portion of the wide range being measured and particularly that portion of the wide range below the transfer point. The transfer circuit is also operable to produce an output in response to the second signal over that portion of the wide range which is above the transfer point. The transfer circuit includes means for biasing at least one of the first and second signals in that portion of the range of the particular signal being biased which is beyond the desired transfer point with the biasing being in sense and extent so as to produce an equality between the first and second signals as biased at a point in the overlapping region of the first and second ranges of the flowmeters. The transfer circuit also includes means for transferring the response of the output signal from one to the other of the first and second signals, as biased, whenever the other of the first and second signals takes a value more extreme in the sense necessary to cause the transfer at the point of equal response so that a bumpless transfer is accomplished at the point of equal response.

DESCRIPTION OF THE PREFERRED EMBODIMENT

Figure 1:
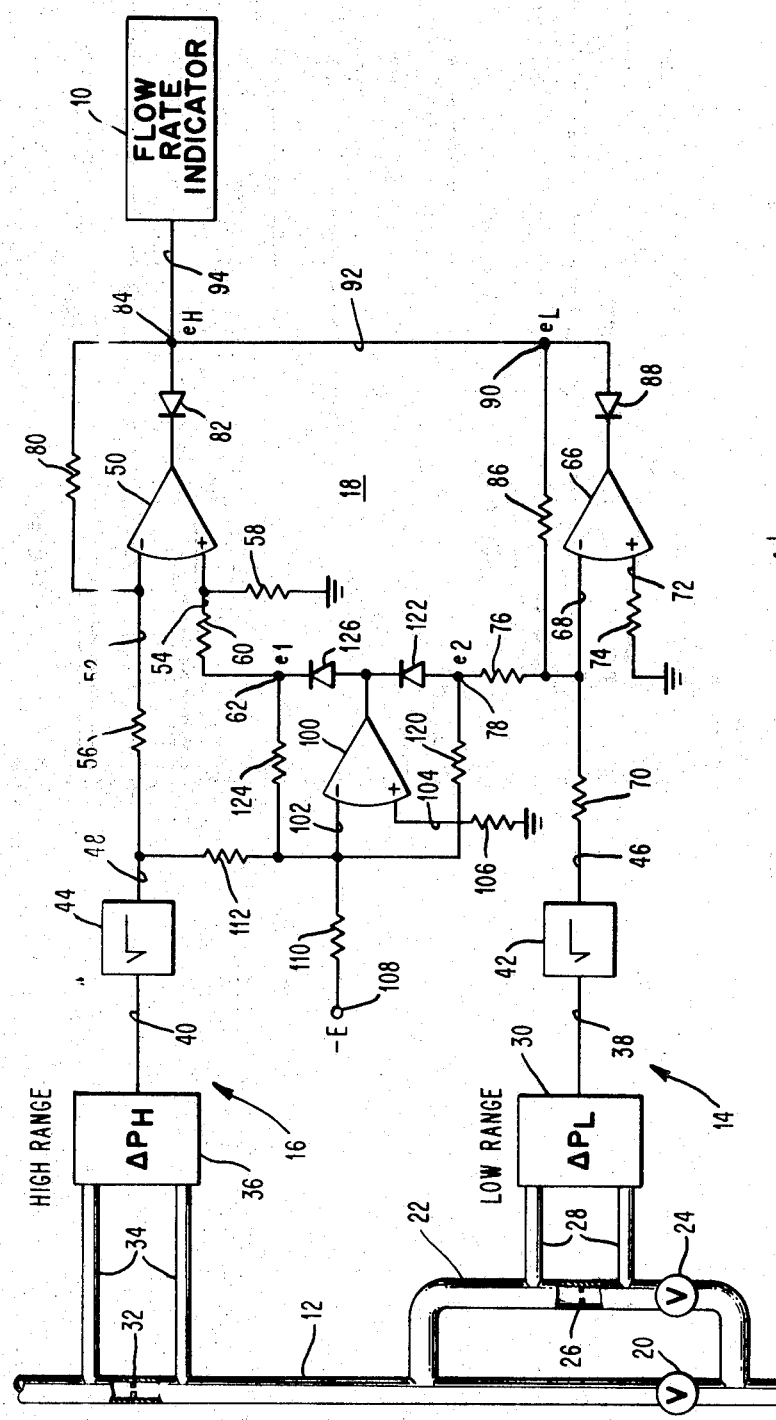
FIG. 1 is a circuit diagram of the preferred embodiment of the present invention.

In FIG. 1 there is shown a circuit for measuring with flow rate indicator 10 a wide range of flow rates for the fluid passing through pipe 12. The circuit utilizes a low range flowmeter 14 and a high range flowmeter 16 along with a transfer circuit 18 to provide a bumpless transfer of the response of the flow rate indicator 10 from the low range meter 14 to the high range meter 16 as the flow rate increases through a particular transfer point and vice versa as the flow rate decreases through the transfer point.

The pipe 12 may incorporate, as shown, a valve 20 in a section of the pipe which is bypassed by pipe 22. The pipe 22 may include, as shown, a valve 24 and a restriction 26 so that when valve 24 is open the restriction 26 provides for a pressure drop $\Delta P_L$ between the pressure taps 28 which connect to the pressure difference measuring apparatus shown as block 30.

The pipe 12 also includes a restriction 32 for producing the necessary pressure drop between pressure taps 34 which are connected to the differential pressure measuring circuit shown as block 36 for measuring the pressure drop $\Delta P_H$.

Both the differential pressure measuring circuits 30 and 36 provide outputs on their respective output lines 38 and 40 to square root extraction circuits respectively shown as blocks 42 and 44 for the low and high range meters 14 and 16. There will then be produced as an output from the square root extraction circuit 42, for example, on line 46 a signal which has a linear relationship to the flow through pipe 22 and there will be produced on the output line 48 a signal having a linear relationship to the flow through pipe 12.

In normal operating practice when the flow in pipe 12 is increasing, for example, but is in the low range measurable by flowmeter 14, the valve 20 will normally be closed and valve 24 will be open so that all of the fluid flowing in pipe 12 must necessarily flow through the restriction 26. When the fluid flow in pipe 12 has increased to a point beyond the range of the low range flowmeter 14, the valve 20 may be opened and if desired the valve 24 may be closed. Similarly, when the flow rate is decreasing from above the low range into the low range, a reverse procedure may be followed with regard to valves 20 and 24.

If, for example, it is assumed that the flow rate in pipe 12 is increasing from a point in the range of the low range flowmeter 14 toward a point beyond the range of flowmeter 14 but within the range of the high range flowmeter 16, it will be evident that it is necessary to transfer the input to the flow rate indicator 10 so that it is responsive first to the output on line 46 of the low range flowmeter 14 and then at some transfer point that response is transferred to the output on line 48 of the high range flowmeter 16. This transfer is preferably carried out so that there is no discontinuity when the transfer occurs or, in other words, so that the transfer is bumpless. At the same time it is desirable that the flow rate indication shown on the indicator 10 should be as accurate as possible. To accomplish these objectives the transfer circuit 18 operates to introduce a bias which is added to either the signal on line 46 or that on line 48 until the signal obtained from lines 46 and 48, as biased by the transfer circuit, are equal in magnitude. At that point a transfer occurs and the flow rate indicator 10 instead of being responsive to the signal on line 46 will be responsive to the signal on line 48. This transfer is accomplished by allowing the flow rate indicator 10 to respond only to that flowmeter signal which is extreme in the sense necessary to cause the transfer, taking into account the biases and the polarities of the biases.

The transfer circuit includes a differential amplifier 50 for adding the bias to the output of the high range meter. Amplifier 50 receives one input on line 52 by way of input resistor 56 from output line 48 of the high range meter 16 and another input on line 54. The input on line 54 is connected by way of resistor 58 to ground and also by way of input resistor 60 to a bias potential point 62 at which there is produced a bias potential $e_1$.

The transfer circuit 18 also includes another differential amplifier 66 which receives one input on input line 68 by way of input resistor 70 from line 46. The other input to 66 appears on line 72 which is connected by way of resistor 74 to ground. Another input on line 68 is obtained by way of input resistor 76 from the bias potential point 78 where the bias potential $e_2$ is produced.

The differential amplifier 50 incorporates a feedback resistor 80 which is connected in series with diode 82 with the series connected resistor and diode connecting the input line 52 to the output of amplifier 50. The diode 82 is poled so that amplifier 50 can produce at output point 84 a signal $e_H$ of negative polarity only.

Amplifier 66 also has a feedback resistor 86 which is connected in series with diode 88 between the input lines 68 and the output of amplifier 66. The diode 88 is poled so that amplifier 66 can produce at output point 90 a potential $e_L$ of negative polarity only. The line 92 connects the output points 84 and 90 so that input line 94 to the flow rate indicator 10 connects the flow rate indicator 10 to respond to the most negative of the potentials produced by the transfer circuit 18 at points 84 and 90.

The biasing circuit of transfer circuit 18 produces the biasing potentials $e_1$ and $e_2$ at points 62 and 78, respectively. The biasing circuit includes a differential amplifier 100 which receives one of its inputs on line 102 and the other of its inputs on line 104. The input on line 104 is connected by way of resistor 106 to ground potential while the input line 102 is connected to both a fixed potential $-E$ at input terminal 108 by way of input resistor 110 and also to line 48 by way of input resistor 112.

The amplifier 100 has as one feedback circuit, a circuit including feedback resistor 120 and diode 122 connected between the input line 102 and the output of amplifier 100 with the biased potential point 78 being located between the resistor 120 and the diode 122 being poled so that the bias $e_2$ can be only negative in potential. Amplifier 100 has another feedback circuit which includes feedback resistor 124 and diode 126 in series circuit between the input line 102 and the output of amplifier 100 with the biased potential point 62 being located between the diode 126 and the resistor 124. The diode 126 is poled so that the biased potential $e_1$ at point 62 can only be positive in polarity.

If, for example, we assume that the signal appearing on line 46 will range from 0 to +10 volts for a flow range of 0 to 25% of full range flow and if we assume that the signal on line 48 will range from 0 to +10 volts for a flow range 0 to 100% of full range flow, the operation of the circuit of FIG. 1 can be better understoood by describing the functions of the transfer circuit 18 particularly if the following values are assigned to the resistors of the transfer circuit, namely:

| Resistor— | Resistance |
|---|---|
| 56 | 20K |
| 58 | 10K |
| 60 | 90K |
| 70 | 80K |
| 74 | 15K |
| 76 | 200K |
| 80 | 20K |
| 86 | 20K |
| 106 | 10K |
| 110 | 160K |
| 112 | 20K |
| 120 | 40K |
| 124 | 40K |

The transfer point may, for example, desirably be at 20% of full range flow in which case the resistor 110 is of a value 160K, as noted above. If a different transfer point is desired, the resistance of resistor 110 may be altered accordingly.

Figure 3:
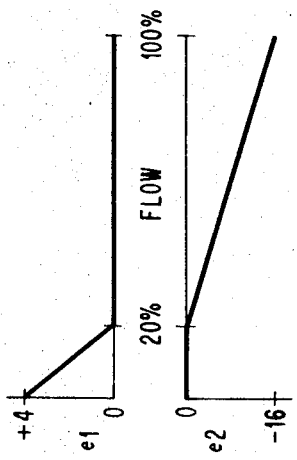
FIG. 3 is a graph showing the bias voltages vs. flow.
Figure 2:
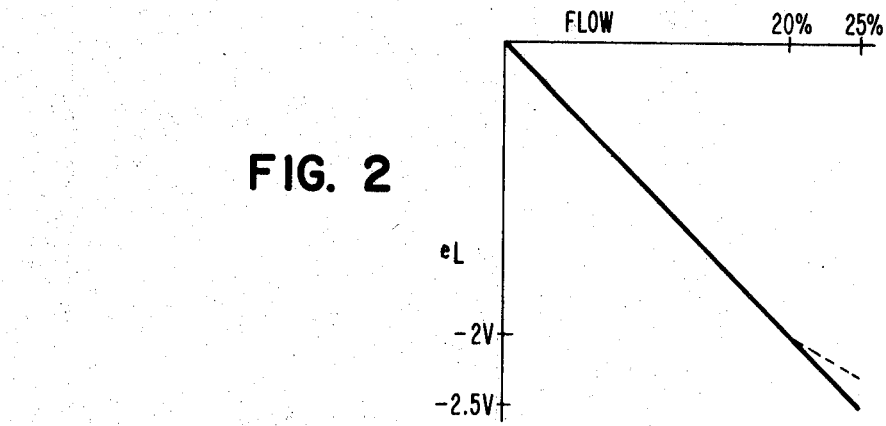
FIG. 2 is a graphical representation of the characteristic of the low range flowmeter.

With the resistances noted above and assuming that $e_2$ is 0 and that line 92 is disconnected, the amplifier 66 will have an amplification factor of 1/4 so that the potential at output line 90, namely $e_L$, would be related to the flow rate as shown by the solid line in FIG. 2. If a biasing potential $e_2$ at point 78 is added and if that biasing potential has an increasingly negative value with an increase in flow rate as shown in FIG. 3, then the potential $e_L$ at point 90 will be modified when the flow rate is above the transfer point of 20% so that the characteristic shown in FIG. 2 will follow the dashed line in that region.

Figure 4:
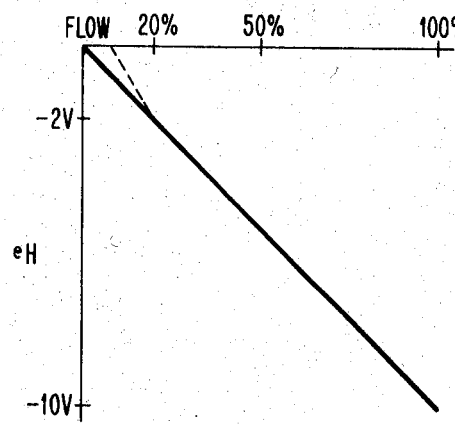
FIG. 4 is a graph similar to FIG. 2 but for the high range meter.

Similarly, with the resistance values indicated above and assuming a zero potential for the biased potential $e_1$ as well as a disconnection of line 92, the amplifier 50 will have an amplification factor of 1 so as to produce at output point 84 a potential $e_H$ which is related to the fluid flow rate as shown by the solid line in FIG. 4.

If there is then added the biasing potential $e_1$ having a characteristic such as that shown in FIG. 3, the potential at output point 84 would then be biased so as to follow the dashed line in the region below the transfer point, namely 20%.

The outputs of amplifiers 50 and 66 will differ from the outputs at points 84 and 90, respectively, only by the magnitude of the drop across the respective diodes 82 and 88.

If the outputs of the flowmeters 14 and 16 cause a response at points 84 and 90 precisely according to the characteristics shown in FIGS. 2 and 4, then as the flow rate increases along the solid line of the characteristic of FIG. 2 the potential at point 90 will be equal to −2 volts at the transfer point; namely, 20% of full range flow and the potential at point 84 will also be −2 volts, as shown in FIG. 4. As the flow increases beyond the 20% point, the effect of the biasing circuit is to produce a bias $e_2$ which will tend to cause the potential at point 90 to be not quite as negative as would be the case in the absence of the bias. With the connection between point 84 and 90 by line 92 the tendency of the potential at point 84 to be more negative than point 90 will cause amplifier 66 to attempt to produce a positive output which will, of course, backbias diode 88 so as to disconnect the feedback circuit for amplifier 66 and thus cause it to go into saturation. Thus, after the flow rate has passed the 20% point, the flow rate indicator 10 is no longer responding to the signal on line 46 but is instead responding to the signal on line 48 so that the flow rate indicator 10 has been transferred from the low range meter 14 to the high range meter 16 and that transfer has been carried out without any discontinuity or bump.

Similarly, if the flow rate is decreasing from a high rate of flow in the range of the high range meter 16 toward the transfer point, the flow rate indicator 10 will respond to the negative potential appearing at line 84 as shown by the characteristic indicated by the solid line in FIG. 4 above the 20% point. When the flow rate gets to the 20% point, the potential at point 84 as the flow rate decreases will tend to become less negative as a result of the biasing potential $e_1$ introduced in the region below 20% flow than would be the case without the introduction of the bias potential. Since the point 84 tends to become less negative than the point 90 in the region below 20%, the amplifier 50 will attempt to produce a positive output which will backbias diode 82 so as to disconnect the feedback circuit of amplifier 50 thus causing it to go into saturation. Since the diode 82 is thus effective to disconnect point 84 from amplifier 50 by virtue of the connection of line 92, the flow rate indicator 10 will then be transferred so that it will respond to the signal on line 46 rather than respond to the signal on line 48.

Figure 5:
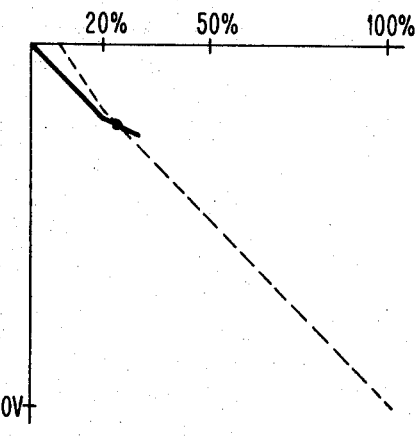
FIG. 5 is a graph showing how the transfer point varies when one of the flowmeters produces an output which is high.

In the case where low range meter 14 tends to produce a higher signal on line 46 than it should, the transfer will take place at a flow higher than the normal transfer point, as shown in FIG. 5, where the biased output of the high range meter 16 is shown as a dashed line and the biased output of the low range meter 14 is shown as a solid line. The point of intersection of those two lines will be the point of transfer, for at that point both the amplifiers 50 and 66 tend to produce, at the respective output points 84 and 90, potentials which are equal, and beyond that point in either direction one or the other of the amplifiers 50 or 66 becomes ineffective because of the effect of the diodes 82 and 88 thus allowing the flow rate indicator 10 to respond only to the biased signal which is more extreme in magnitude; in this case, that signal which is the most negative in potential.

Figure 6:
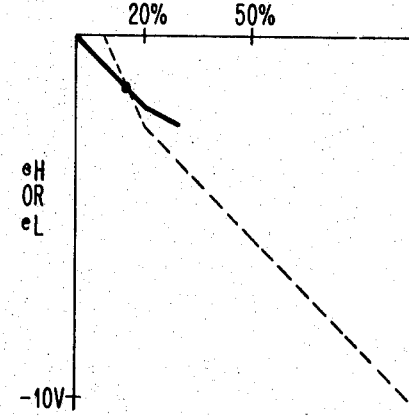
FIG. 6 is a graph showing how the transfer point varies when another of the flowmeters produces an output which is high.

If the low range meter 14 is indicating low with respect to the high range meter 16, the transfer will occur at some point below the normal transfer point, as shown in FIG. 6, where the dashed line indicates the biased signal produced by the high range meter 16 and the solid line indicates the biased signal produced by the low range meter 14.

It will be evident to those skilled in the art that the circuit of FIG. 1 is but one form of the invention. Many variations of the circuit of FIG. 1 could be used. For example, the flowmeters need not be of the type disclosed but instead could be of any of the well known types as long as they produce signals with sufficient accuracy to accomplish the purpose of the flow meter. Also, of course, the differential amplifiers could readily be replaced by high gain operational amplifiers of the type having a single input. With such an arrangement, however, it would be necessary to introduce the bias $e_1$ into the input of the amplifier replacing amplifier 50 only after effecting a sign change such as might be provided by another operational amplifier.

We claim:

1. Apparatus for measuring the flow rate of a fluid over a wide range comprising:
   a first flowmeter operable to produce a first signal variable as a function of the flow rate of said fluid over a first range,
   a second flowmeter operable to produce a second signal variable as a function of the flow rate of said fluid over a second range overlapping said first range and extending to higher flow rates than said first range, and
   a transfer circuit operable to produce an output signal in response to said first signal over a portion of said wide range below a desired transfer point and in response to said second signal over the portion of said wide range above said desired transfer point, said transfer circuit including:
      means for biasing at least one of said first and second signals in that portion of the range of said one of said first and second signals beyond the desired transfer point in sense and magnitude to produce an equality between the magnitudes of first and second signals, as biased, at a point in the overlapping region of said first and second ranges, and
      means for transferring the response of said output signal from one to the other of said first and second signals, as biased, as said other of said first and second signals takes a value more extreme in the sense necessary to cause such transfer at said point of equal response, whereby a transfer is accomplished without discontinuity.

2. Apparatus as set forth in claim 1 in which said biasing means is operable to bias both said first and second signals in that portion of their respective ranges beyond the desired transfer point, said biases being in sense and magnitude to produce an equality between the biased first and second signals at a point in the overlapping region of said first and second ranges.

3. Apparatus as set forth in claim 1 in which said transferring means includes diodes connected to provide output signals only in the sense necessary to cause transfer at the point of equal response.

4. Apparatus for providing a transfer of a fluid flow measuring circuit without discontinuity so that it is responsive to the output signal of a first flowmeter over that portion of a first range below a predetermined transfer point and responsive to the output of a second flowmeter over a second range extending to higher flow rate values from said transfer point and overlapping said first range in a region including said transfer point comprising:
   means for biasing one of said output signals of said first and second flowmeters over the portion of its range beyond said transfer point so that said outputs are equal at one point, and
   means operable to connect said measuring circuit to the output which is most extreme in value in the sense necessary to transfer said measuring circuit at said point of equal outputs.

5. Apparatus for measuring the rate of flow of a fluid over a wide range comprising:
   a first flowmeter operable to produce a first signal variable as a function of the flow rate of said fluid over a first range,
   a second flowmeter operable to produce a second signal variable as a function of the flow rate of said fluid over a second range overlapping and extending to higher flow values than said first range,
   means for biasing at least one of said signals over a predetermined portion of the flow range of the associated flowmeter so that the first and second signals as biased have the same value at one magnitude of flow, and
   output means responsive to that one of said first and second signals as biased whose value is the most extreme in the sense necessary to provide a transfer of the response of said output means from the first signal to the second signal as the flow increases in the overlapping region of the respective flowmeter ranges so that a transfer of said output means from said first to said second range is accomplished without discontinuity.

6. In an apparatus for measuring the flow rate of a fluid over a wide range which utilizes a first flowmeter operable to produce a first signal variable as a function of the flow rate of said fluid over a first range and a second flowmeter operable to produce a second signal as a function of the flow rate of said fluid over a second range overlapping said first range and extending beyond said first range to a higher flow rate, the means for providing a transfer of the output response between said flowmeters without discontinuity which comprises:
a first amplifier operable to produce at its output a signal responsive to the difference between a first input from said first signal and a second input,
a second amplifier operable to produce at its output a signal responsive to the difference between a first input from said second signal and a second input,
a biasing circuit operable to selectively bias the outputs of said first and second amplifiers by supplying signals to the second inputs of said first and second amplifiers when said first and second signals are, respectively, in ranges indicative of flow rates in the corresponding first and second ranges at values beyond a predetermined transfer point in the overlapping region of said ranges, said biasing means including a third amplifier responsive to a fixed signal and said second signal and operable to produce outputs of opposite polarity to provide said selective biasing of the output of said first and second amplifiers in dependence upon the relative value of said first and second signals and the value of said predetermined transfer point, and
means connecting the outputs of said first and second amplifiers to provide an output signal indicative of the fluid flow rate over said wide range, said connecting means including diodes to provide a transfer of said output response between said ranges.

7. Apparatus of the type set forth in claim 6 in which said biasing circuit includes a first and second feedback circuit for said third amplifier with each of said feedback circuits incorporating a series connected resistor and diode so that current flows in one of said feedback circuits to produce said second input to said first amplifier of one polarity when said first signal is beyond said transfer point and so that feedback current flows through the other of said feedback circuits to produce the second input to the second amplifier in the other polarity when said second signal is beyond the transfer point.

References Cited
UNITED STATES PATENTS

| | | | |
|---|---|---|---|
| 3,176,518 | 4/1965 | Morris et al. | 73—517 |
| 3,410,138 | 11/1968 | Lynch | 73—197 |

JAMES J. GILL, Primary Examiner

M. SMOLLAR, Assistant Examiner